United States Patent [19]

McNulty

[11] Patent Number: 4,762,089
[45] Date of Patent: Aug. 9, 1988

[54] HORSE-GROOMING TETHER DEVICE AND IMPROVED HORSE GROOMING STALL

[75] Inventor: Robert A. McNulty, Carthage, N.C.

[73] Assignee: Adrian De Pasquale, Pinehurst, N.C.; a part interest

[21] Appl. No.: 806,665

[22] Filed: Dec. 9, 1985

[51] Int. Cl.⁴ .............................................. A01K 1/06
[52] U.S. Cl. ................................................. 119/109
[58] Field of Search ............... 119/109, 118, 119, 124, 119/96; 242/107.6, 107.12; 54/34

[56] References Cited

U.S. PATENT DOCUMENTS

| 1,455,715 | 5/1923 | Danese | 242/107.12 |
| 3,088,438 | 5/1963 | Oliphant | 119/109 X |
| 3,123,052 | 3/1964 | Marshall | 119/109 X |
| 3,693,596 | 9/1972 | Croce et al. | 119/109 |
| 3,700,184 | 10/1972 | Francis | 242/107.6 X |
| 4,621,589 | 11/1986 | Thinnes | 119/124 X |

FOREIGN PATENT DOCUMENTS 347 of 1888 United Kingdom ................ 119/124

Primary Examiner—Robert P. Swiatek
Attorney, Agent, or Firm—Shefte, Pinckney & Sawyer

[57] ABSTRACT

An improved horse grooming stall utilizing tether devices on opposite side walls, each tether device having a spring-biased spool for controlling withdrawal and retraction of a retaining strap. A horse is groomed by latching the straps of the tether devices to opposite sides of the horse's harness to hold it essentially stationary during grooming without risk of injury.

6 Claims, 4 Drawing Sheets

HORSE-GROOMING TETHER DEVICE AND IMPROVED HORSE GROOMING STALL

BACKGROUND OF THE INVENTION

The present invention relates generally to devices and apparatus for use in grooming horses and like animals and, more particularly to horse-retaining tether devices and horse grooming stalls utilizing same.

As is widely known, horses of the type particularly bred for racing or show purposes have become in recent years a relatively popular and often lucrative investment-type property, individual horses typically commanding purchase prices of tens of thousands of dollars and often considerably more. Accordingly, extraordinary precautions and care are taken in tending to the various needs of horses of this type.

For instance, such horses are meticulously groomed daily before and after every training session, as well as before and after each race or show performance. However, despite the ever increasing investment value of show and race horses, the method and tools presently utilized for grooming have remained essentially unchanged for many years. Grooming is ordinarily performed in a horse stall equipped on opposite side walls thereof with lengths of heavy gauge metal chain adapted to be latched to opposite sides of a horse's halter to hold the horse while it is washed, brushed and other grooming chores are performed. In addition, horses must be chained in this manner when being attended by a veterinarian or a farrier. Disadvantageously, such chains provide no convenient means of adjusting the length thereof to permit selectively restricting the horse to a desired limited range of movement to retain the horse essentially stationary during grooming. The heavy metal gauge of chains typically used also poses some risk of injury to the horse, which occurs on occasion sometimes resulting in critical injury. Furthermore, the chains are provided with no safe means of stowage when not in use, further presenting a risk of injury, and accordingly, the chains must be removed from the stall following each grooming.

In contrast, the present invention provides a substantially improved tether device and an improved horse grooming stall utilizing same which essentially eliminates all of the aforementioned disadvantages and poses virtually no risk of injury to the horse.

SUMMARY OF THE INVENTION

Briefly described, the improved horse grooming stall of the present invention basically includes a pair of laterally spaced upstanding side walls and a pair of tether devices respectively mounted on the side walls in facing relation to one another. Each of the tether devices inclues a spool arrangement having a length of a retaining strap retractably wound thereon for winding and unwinding of the strap. A latch member is provided at the free end of the strap for latching engagement to a halter on a horse. The pair of tether devices is thus adapted for selective unwinding of their straps and engagement of their latches respectively to opposite sides of a halter on a horse positioned in the stall between the side walls for retaining the horse essentially stationary for grooming.

Preferably, the side walls of the stall are arranged in vertical parallel facing relation defining therebetween a grooming space within which a horse may be positioned with the walls at the opposite left and right sides of the horse's body. Each of the tether devices preferably includes a mounting base plate for affixation to the respective side wall and a spool rotatably mounted on the base plate. The retaining strap is affixed at one end to the spool for winding thereon and unwinding therefrom and the latch member is attached to the opposite free end of the strap. A spring biasing arrangement is provided for urging the spool rotatably to retractably wind the strap on the spool and is yieldable to permit selective unwinding of the strap from the spool. A locking arrangement permits the spool to be selectively locked in selected unwound positions with the strap extending outwardly from the spool. Guide rollers constrain and guide the strap to be withdrawn upwardly from the spool and then outwardly therefrom. A casing is affixed to the mounting base plate for substantially enclosing the spool and has an upward opening for winding and unwinding of the strap therethrough and for retaining the latch member accessible when the strap is in its retracted position. The pair of tether devices are respectively mounted on the side walls of the stall at approximately the elevation of the horse's head. Thus, the straps of the tether devices may be selectively unwound and locked at a desired withdrawn strap length to restrict the horse to a relatively limited range of movement within the grooming space of the stall to retain the horse essentially stationary during grooming without risk of injury to the horse.

DESCRIPTION OF THE PREFERRED EMBODIMENT

Figure 1:
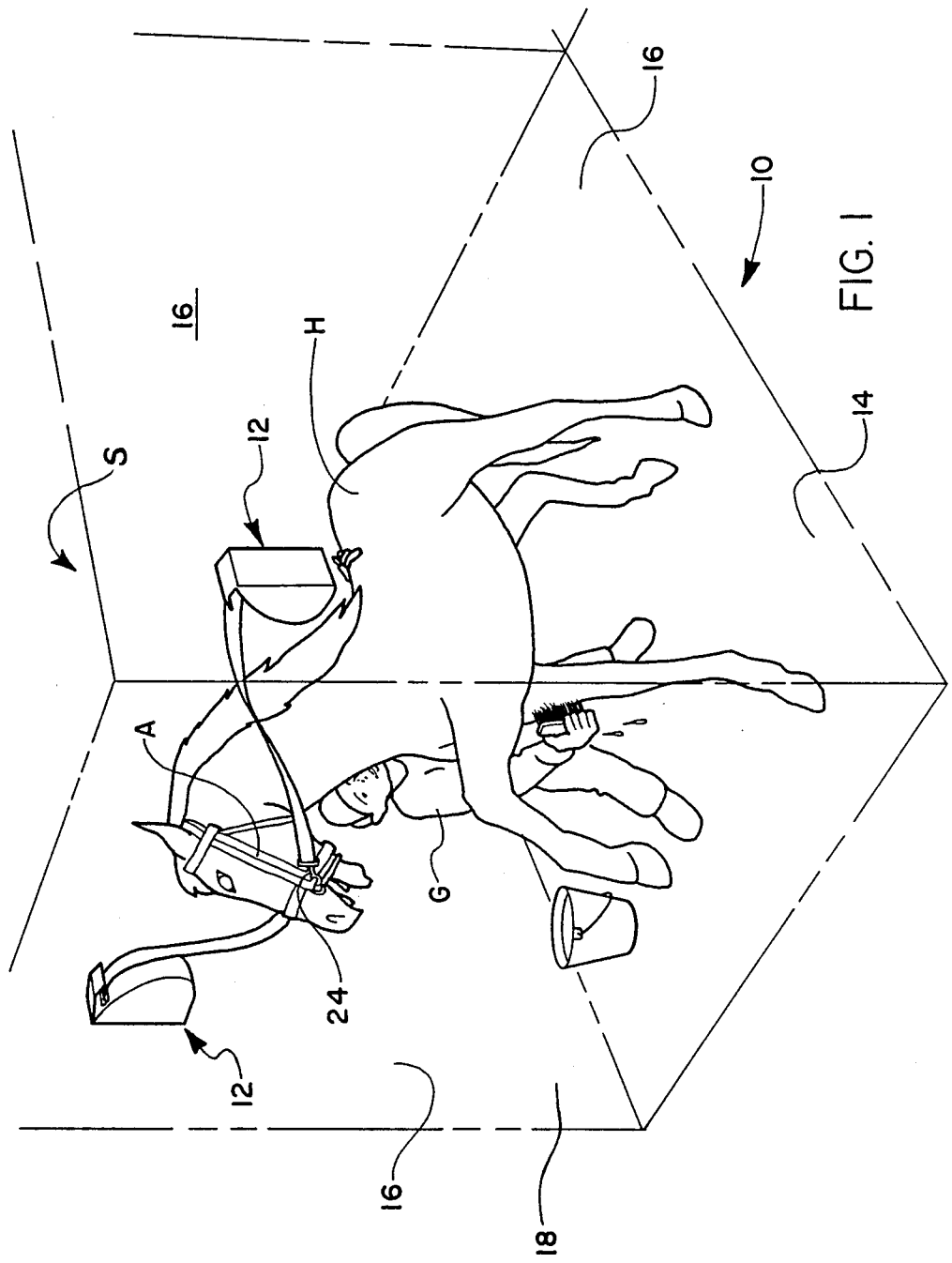
FIG. 1 is a perspective view of a horse grooming stall according to the present invention, equipped with a pair of the present tether devices.

Referring now to the accompanying drawings and initially to FIG. 1, a horse grooming stall according to the present invention is shown generally at 10, equipped with a pair of tether devices indicated generally at 12 according to the present invention.

The stall 10 basically includes a flat floor surface 14, a pair of vertical side walls 16 arranged at lateral spacings in parallel facing relation to one another, and an end wall 18 extending between the side walls 16 at corresponding ends thereof. A gate or other closure (not shown) will ordinarily be pivotably mounted to one of the side walls 16 at the opposite end thereof from the end wall 18 for opening and closing movement toward and away from the other side wall 16 to open and close the grooming space S defined between the side and end walls 16, 18. The lateral dimension of the grooming space S between the side walls 16 is sufficient to permit a horse H to be positioned centrally in the grooming space S with the side walls 16 at the opposite left and right sides of the horse's body with sufficient space left between both sides of the horse's body and the adjacent side walls 16 for a groomer G to move freely about the horse H to wash and groom it.

The pair of tether devices 12 are mounted respectively on the side walls 16 at an elevation approximately the same as or slightly higher than the horse's head. Basically, each tether device 12 includes a spool arrangement, indicated generally at 20 (FIGS. 2 and 3), having a length of woven fabric retaining strap 22 carrying a latch 24 at its outer free end retractably wound on the spool arrangement 20 for selective winding and unwinding of the strap 22 for engagement of the latch 24 to the adjacent side of a halter or similar harness A worn by the horse H to be groomed.

Figure 2:
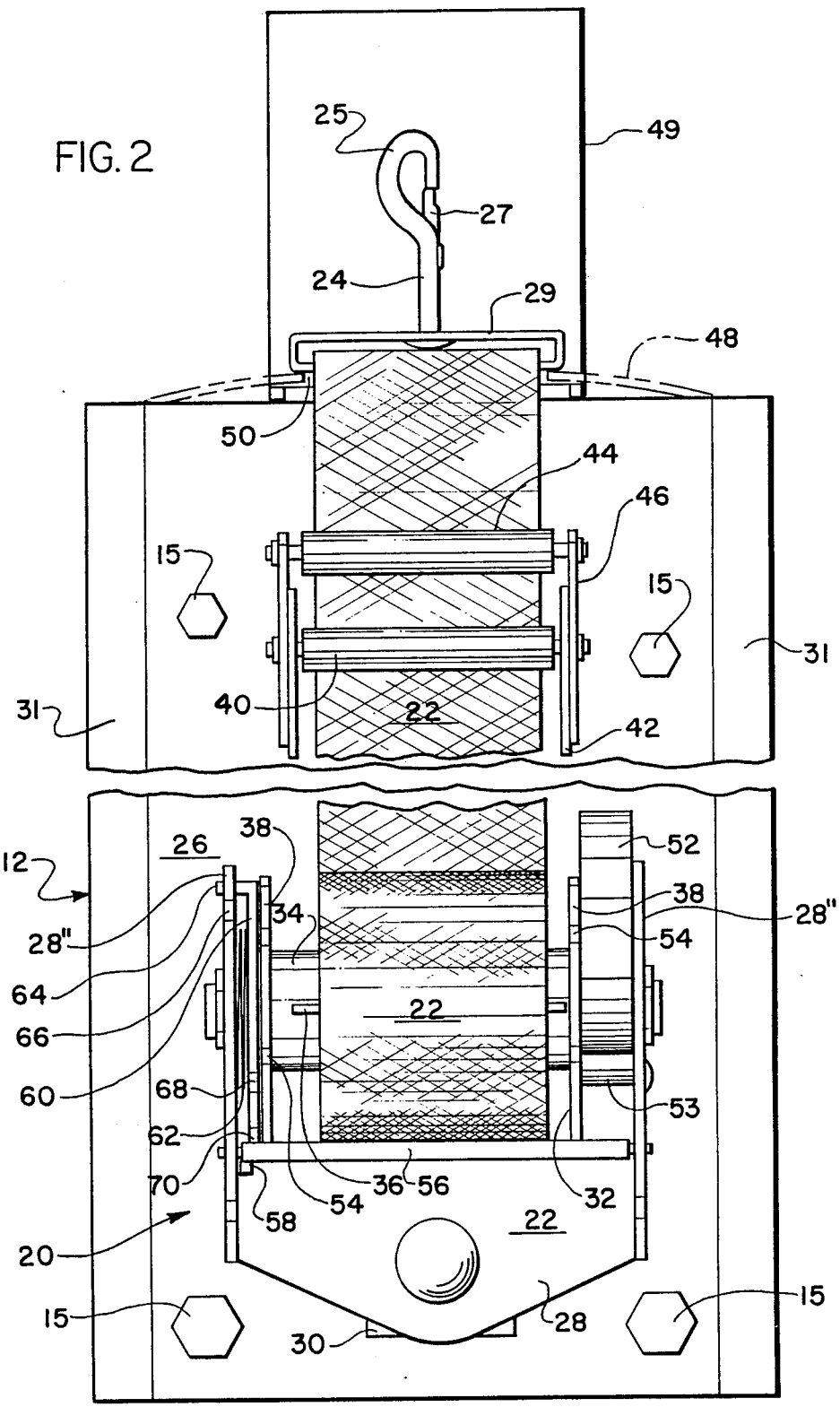
FIG. 2 is a front elevational view of one of the tether devices of FIG. 1, with the casing thereof partially broken away.
Figure 3:
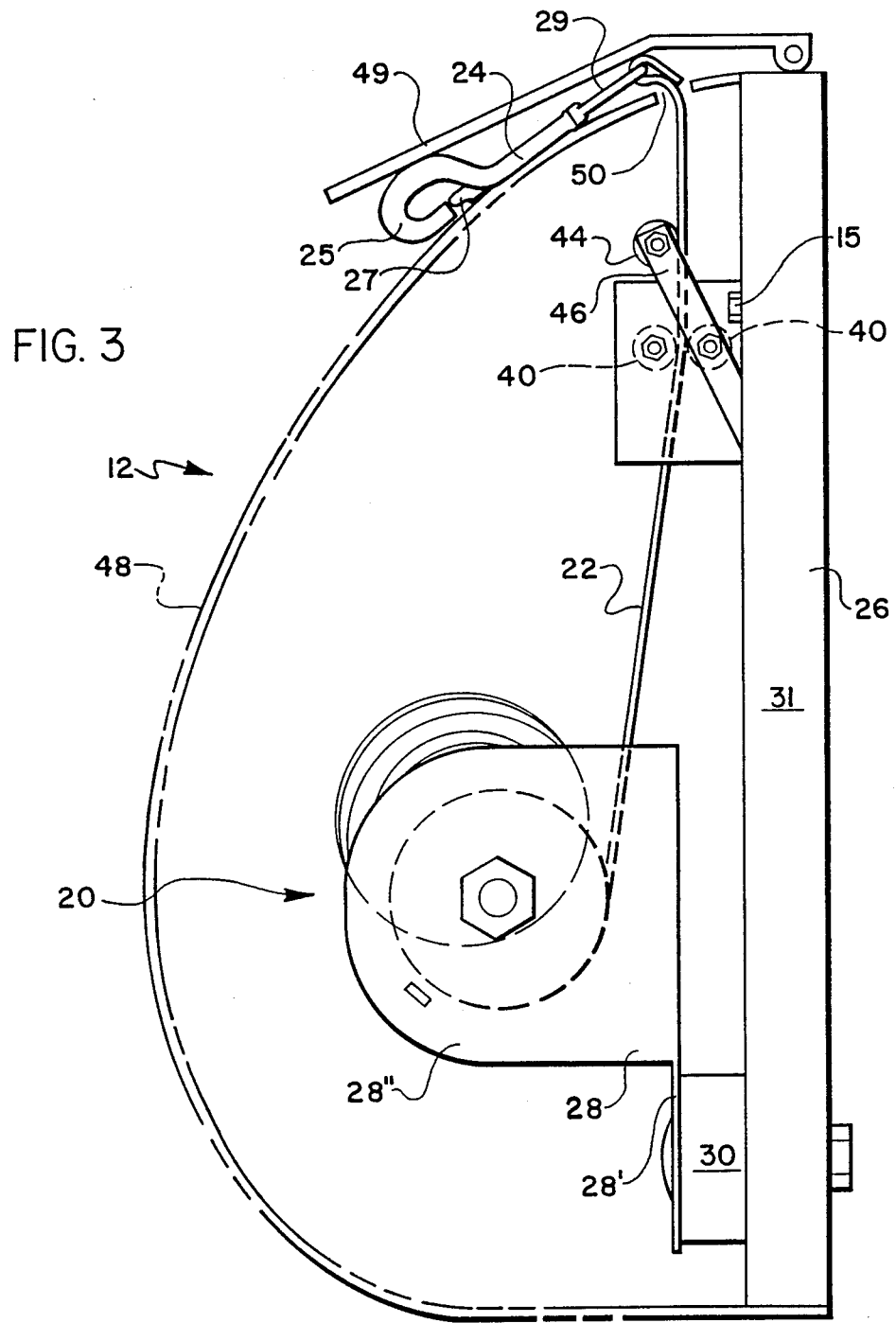
FIG. 3 is a right side elevational view of the tether device of FIG. 2, with the casing partially broken away.

As best seen in FIGS. 2 and 3, each tether device 12 includes a rectangular base plate 26 mounted by bolts 15 or other suitable fasteners in upright disposition to its respective side wall 16 of the grooming stall 10. The spool arrangement 20 includes a U-shaped bracket 28 having its transverse portion 28' bolted to the lower end of the base plate 26 at a slight outward spacing therefrom maintained by a spacer member 30, with the opposite side portions 28" of the bracket 28 extending outwardly of the base plate 26 in spaced parallel relation. A flanged spool 32 is rotatably mounted on the bracket 28 between the opposite side portions 28" thereof with the shaft 34 of the spool 32 extending through and being rotatably journaled in the side portions 28". One end of the strap 22 is rigidly held in an axial slot 36 formed in the spool shaft 34 between the flanges 38 of the spool 32 to permit rotational winding and unwinding of the strap 22 on the spool 32. The strap 22 is trained upwardly from the spool 32 between a pair of guide rollers 40 rotatably supported in horizontally spaced parallel relation in a bracket 42 mounted at the upper end of the base plate 26 centrally above the spool arrangement 20. From the guide rollers 40, the strap 22 is trained upwardly a short further distance behind another guide roller 44 supported rotatably on a pair of arms 46 affixed to and extending upwardly from the bracket 42. The latch 24 is affixed to the outer free end of the strap 22 and is of the conventional swivel type having a hook member 25 rotatably supported on a mounting ring 29 by which the latch 24 is affixed to the outer free end of the strap 22, with a spring-loaded latch member 27 being provided at the open mount of the hook member 25. A plastic casing 48 is removably affixed to the base plate 26 by a friction fit between the side flanges 31 of the base plate 26 to substantially enclose the spool arrangement 20, the casing 48 being essentially dome-shaped in its main body and merging upwardly in a rounded top portion having in an opening 50 immediately above the guide roller 44. The opening 50 is sufficiently small to prevent the passage therethrough of the mounting ring 29 of the latch 24 so as to maintain the latch 24 exteriorly of the casing 48 at the opening 50 when the strap 22 is retractably wound onto the spool 32. As desired, the base plate 26 may include a cap member 49 pivotably mounted to the upper edge of the base plate 26 and spring loaded to urge the cap member 49 into covering relation to the opening 50 to cover the latch 24 when the strap 22 is fully retracted as shown in FIG. 3 and to pivot out of way to permit unwinding of the strap 22 as shown in FIG. 2.

The spool arrangement 20 further includes a biasing arrangement for automatic strap-retracting winding of the spool 32. A coil band spring 52 is positioned intermediate the right flange 38 of the spool 32 and the supporting side portion 28" of the bracket 28 with the radially inward end of the spring 52 affixed to the shaft 34 of the spool 32 and the radially outward end of the spring 52 affixed at 53 to the right side portion 28" of the bracket 28. In this manner, the spring 52 biases the spool 32 to wind the strap 22 thereon and the spring 52 is normally relaxed when the strap 22 is fully wound onto the shaft 34 of the spool 32. However, the spring 52 is yieldable to permit unwinding withdrawl of the strap 22 and becomes progressively contracted as the strap 22 is withdrawn from the spool 32 thereby loading the spring 52 to biasingly urge the spool 32 rotatably in the opposite direction from its strap-unwinding rotational direction to rotatably rewind the strap 22 onto the spool 32 once the strap-withdrawing force is removed.

A locking arrangement is provided for permitting selective locking of the spool 32 with the strap 22 in various unwound positions extending outwardly from the spool 32. Each of the flanges 38 of the spool 32 are provided with notches 54 formed in the outer periphery thereof at equal circumferential spacings thereabout and a locking bar 56 is mounted at its opposite ends rotatably in the side portions 28" of the bracket 28 to extend therebetween in the vicinity of the notches 54 for selective engagement therein to lock the spool 32 against rewinding rotation. A flat spring 58 is mounted to the inner surface of the left side portion 28" of the bracket 28 in biasing contact with the left end of the locking bar 56 to urge it into locking engagement in the notches 54 of the flanges 38. A cam disk 60 is mounted coaxially with the spool 32 rotatably about its shaft 34 between the left flange 38 of the spool 32 and the left side portion 28" of the bracket 28 for controlling the movement of the locking bar 56 into and out of engagement in the notches 54 of the flanges 38. A small spiral spring 62 is positioned coaxially about the shaft 34 between the control disk 60 and the left side portion 28" of the bracket 28 to bias the control disk 60 into frictional surface contact with the left flange 38 of the spool 32 for rotational movement of the control disk 60 with the left flange 38, the control disk 60 including a tang 64 projecting axially from the outer periphery thereof into an arcuate slot 66 formed in the left side portion 28" of the bracket 28 to restrict the extent of rotational movement of the control disk 60 with the left flange 38 of the spool 32. The control disk 60 includes a pair of cam portions 68, 70 (FIGS. 4A–4C) projecting radially outwardly from the outer periphery of the disk 60 at a small circumferential spacing corresponding to the arcuate extent of the slot 66, the portions 68, 70 being positioned respectively to engage the locking bar 56 and hold it against the biasing force of the flat spring 58 out of locking engagement with the notches 54 when the tang 64 is positioned at the opposite ends of the arcuate slot 66. The peripheral portion of the control disk 60 between the cam portions 68, 70 is, however, of a reduced radial dimension sufficient to permit the biasing spring 58 to move the locking bar 56 into locking engagement in the notches 54 when the tang 64 is positioned within the central area of the slot 66.

Figure 4A:
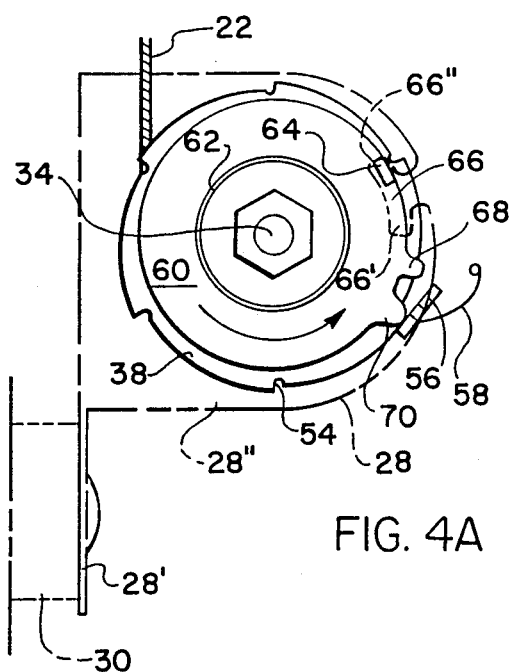
FIGS. 4A, 4B, and 4C are detailed left side elevational views of the spool arrangement of the tether device of FIGS. 2 and 3, showing it in its unlocked and locked conditions, respectively.
Figure 4C:
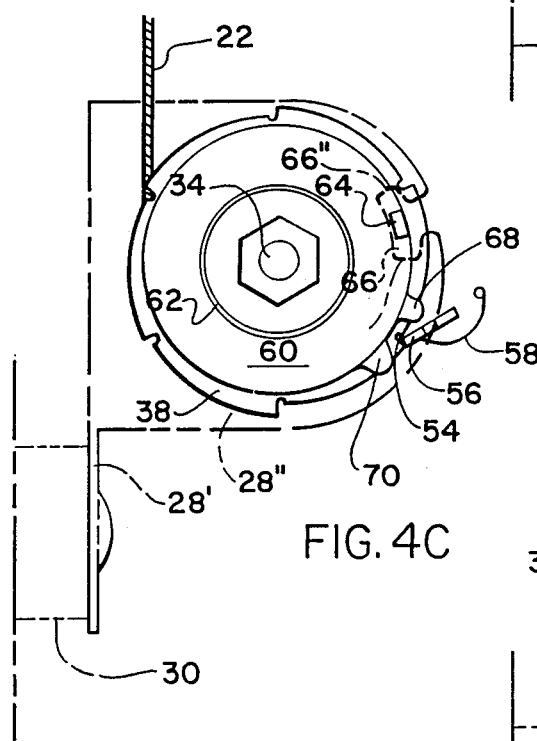
Figure 4B:
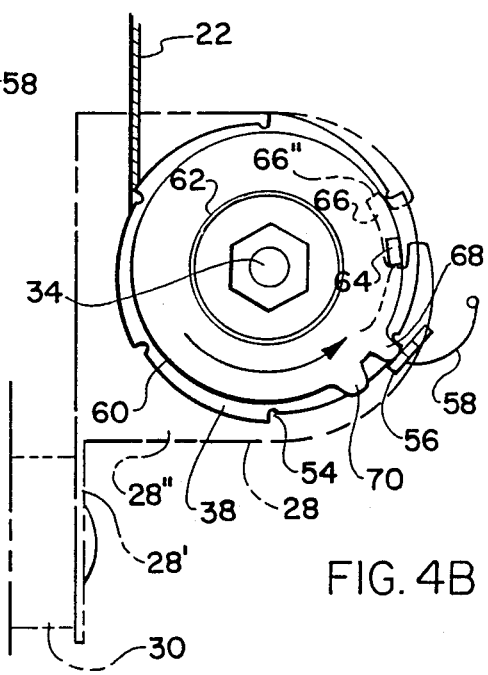

Accordingly, as seen in FIG. 4A, when the strap 22 is being withdrawn from the spool 32, the rotational action of the left flange 38 acts frictionally on the control disk 60 to rotate it to bring the tang 64 into contact with the end 66" of the slot 66 to position the cam portion 68 to hold the locking bar 56 out of engagement in the notches 54 during such unwinding movement. Similarly, as shown in FIG. 4B, when the strap 44 is released for rewinding on the spool 32, the rotational action of the left flange 38 frictionally on the control disk 60 rotates it to move the tang 64 to the opposite end 66' of the slot 66 to position the cam portion 70 in engagement with the locking bar 56 to hold it out of locking engagement with the notches 54 during rewinding of the strap 22 on the spool 32. On the other hand, as shown in FIG. 4C, during either the aforementioned unwinding or rewinding movement of the strap 22, the exertion of a slight tug on the strap 22 to cause a hesitation in the unwinding or winding movement is sufficient to momentarily position the tang 64 in the center of the slot 66 to permit the spring 58 to urge the locking bar 56 into locking engagement in the notches 54 of the spool flanges 38 to lock the spool 32 against rewinding rotational movement, in this manner permitting the operator to selectively lock the spool arrangement 20 with a desired length of the strap 22 unwound and extending outwardly from the spool 32.

The operation of the tether devices 12 and the grooming stall 10 of the present invention will thus be understood. Initially, of course, a horse H to be groomed is led head first into the grooming space S in the stall 10, the horse H wearing a harness A about its head and neck so as to permit the horse's movements to be controlled through the harness A. The groomer G then lifts the caps 49 at the top of each tether device 12 to expose the latches 24 thereof. He then grasps the latch 24 of one of the tether devices 12 and exerts a pulling force thereon to unwind the strap 22 therefrom until a desired sufficient length of the strap 22 is withdrawn. The groomer G then exerts a hesitation tug on the strap 22 to engage the locking bar 56 in the notches 54 of the spool flanges 38 in the aforedescribed manner and engages the latch 24 with one side of the horse's harness A. The identical operation is then carried out to attach the latch 24 of the other tether device 12 to the opposite side of the horse's harness A. Preferably, the respective lengths of the straps 22 withdrawn from the two tether devices 12 is just sufficient to reach to and engage with the horse's harness A so that the horse is essentially restricted to a relatively limited range of movement to retain the horse essentially stationary during grooming. Since the locking mechanisms of the tether devices 12 essentially prevent undesired rewinding of the straps 22, any movements by the horse H tending to further withdraw the straps 22 will be generally unrestricted to minimize risk of injury to the horse H. On the other hand, any movements by the horse H tending to release either or both of the locking mechanisms of the tether devices 12 will automatically produce rewinding movement of one or both of the straps 22 to bring the strap or straps 22 taut whereby no loose extent of the straps 22 will exist in which the horse H could become entangled and resultantly suffer possible injury. Furthermore, the straps 22 are preferably formed of a fabric or similar webbing material which poses little risk of injury to the horse H in substantial contrast to the conventional heavy gauge link chains now in use. The tether devices 12 permit convenient stowage of the straps 22 and the latches 24 out of way of the horse's movements within the stall so as to also pose essentially no risk of injury to the horse when the tether devices 12 are not in use.

Although the preferred locking mechanism utilized in the tether devices 12 is adapted when engaged to lock its associated strap 22 against rewinding movement while permitting further strap unwinding movement, it is contemplated that a spool arrangement utilizing a locking mechanism which when engaged oppositely locks its associated strap against unwinding movement while permitting rewinding movement would also function acceptably within the scope and concept of the present invention. Tether devices utilizing such a locking mechanism are considered less desirable in that, once latched to the horse with the locking mechanism engaged, the devices will essentially restrict all movements of the horse against further unwinding withdrawal of the straps which, although better restricting the horse's movements, poses a somewhat greater danger of injury. Nevertheless, tether devices utilizing such a locking mechanism would still provide the advantage of compensating for horse movements tending to unlock the locking mechanism and would substantially keep taut the straps during use to minimize injury to the horse which could result from entanglement in the straps, as well as permitting ready stowage of the straps when not in use.

It will therefore be readily understood by those persons skilled in the art that the present invention is susceptible of a broad utility and application. Many embodiments and adaptions of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoiong disclosure is not intended or to be construed to limit the present invention or otherwise to exclude any such other embodiments, adaptations, variations modifications and equivalent arrangements, the present invention being limited only by the claims appended hereto and the equivalents thereof.

I claim:

1. An improved horse grooming stall comprising a pair of laterally spaced upstanding side walls and a pair of tether means respectively mounted on said side walls in facing relation to one another, each said tether means comprising spool means having a length of a retaining strap retractably wound thereon for winding and unwinding of said strap and latch means at the free end of said strap for latching engagement to a halter on a horse, said pair of tether means being adapted for selective unwinding of their said straps and engagement of their said latch means respectively to opposite sides of a halter on a horse positioned between said side walls, each said spool means including means for selectively locking releasably said spool in selected unwound positions with a desired length of said strap extended outwardly from said spool to resist unintended rewinding of said strap in each said unwound position in response to movements of the horse while permitting further unwinding of said strap to safely accommodate a limited range of movement of the horse for retaining the horse essentially stationary for grooming without risk of injury to the horse.

2. An improved horse grooming stall according to claim 1 and characterized further in that each said spool means includes a rotatable spool having an end of its said strap affixed thereto and spring biasing means urging said spool rotatably to retractably wind its said strap on said spool and being yielding to permit selective unwinding of said strap from said spool.

3. An improved horse grooming stall according to claim 1 and characterized further in that each said tether means includes a mounting base affixed to the respective said side wall and a casing affixed to said base for substantially enclosing said spool means.

4. An improved horse grooming stall according to claim 3 and characterized further in that said casing includes an opening for winding and unwinding movement of said strap therethrough, said opening being adapted to retain said latch means accessible when said strap is fully wound on said spool.

5. An improved horse grooming stall according to claim 1 and characterized further in that each said tether means includes roller guide means for constraining and guiding said strap to be withdrawn upwardly from said spool means and then outwardly therefrom.

6. An improved horse grooming stall comprising a pair of laterally spaced parallel vertical side walls defining therebetween a grooming space for positioning of a horse in said space with said walls at the opposite left and right sides of the horse's body, and a pair of tether means respectively mounted on said side walls at approximately the elevation of the horse's head, each said tether means including a mounting base plate affixed to the respective said side wall, a spool rotatably mounted on said base plate, a length of a retaining strap affixed at one end thereof to said spool for winding thereon and unwinding therefrom, latch means attached to the opposite free end of said strap for latching engagement to a halter on a horse, spring biasing means urging said spool rotatably to retractably wind said strap on said spool and being yielding to permit selective unwinding of said strap from said spool, means for selectively locking releasably said spool in selected unwound positions with said strap extended outwardly from said spool to resist unintended rewinding of said strap in each said unwound position while permitting further unwinding of said strap, roller guide means for constraining and guiding said strap to be withdrawn upwardly from said spool and then outwardly therefrom, and a casing affixed to said mounting base plate for substantially enclosing said spool and presenting an upward opening for winding and unwinding of said strap therethrough and for retaining said latch means accessible when said strap is in its retracted position, said pair of tether means being adapted for selective unwinding and locking of their said straps at a desired withdrawn strap length and engagement of their said latch means respectively to opposite sides of a halter on a horse positioned in said grooming space for resisting unintended rewinding of said straps in response to movements of said horse while permitting further unwinding of said straps to safety accommodate a relatively limited range of movement of the horse for restricting the horse to a relatively limited range of movement to safely retain the horse essentially stationary for grooming without risk of injury to the horse.

* * * * *

UNITED STATES PATENT AND TRADEMARK OFFICE
CERTIFICATE OF CORRECTION

PATENT NO.   :  4,762,089
DATED        :  August 9, 1988
INVENTOR(S)  :  Robert A. McNulty It is certified that error appears in the above-identified patent and that said Letters Patent is hereby corrected as shown below:

Column 3, Line 45, reads "mount" but should read -- mouth --.

Column 4, Line 8, reads "withdrawl" but should read -- withdrawal --.

Column 4, Line 68, reads "strap 44" but should read -- strap 22 --.

Column 5, Line 47, reads "unrestricted" but should read -- unresisted --.

Column 6, Line 7, reads "mechanism" but should read -- mechanisms --.

Column 6, Line 15, reads "mechanism" but should read -- mechanisms --.

Column 6, Line 35, reads "foregoiong" but should read -- foregoing --.

Column 6, Line 37, after "variations" add -- , --.

Column 8, Line 24, reads "safety" but should read -- safely --.

Signed and Sealed this

Twenty-fifth Day of August, 1992

Attest:

DOUGLAS B. COMER

Attesting Officer          Acting Commissioner of Patents and Trademarks